Dec. 12, 1961　　　　SHO TAKAHAMA　　　　3,012,490
DEVICE FOR PREVENTING THE OVERWINDING OF FILM AND THE
PREMATURE RELEASE OF THE SHUTTER
IN A PHOTOGRAPHIC CAMERA

Filed March 23, 1959　　　　　　　　　　2 Sheets-Sheet 1

INVENTOR
SHO TAKAHAMA
BY Stanley Wolder
ATTORNEY

Dec. 12, 1961　　　　　SHO TAKAHAMA　　　　　3,012,490
DEVICE FOR PREVENTING THE OVERWINDING OF FILM AND THE
PREMATURE RELEASE OF THE SHUTTER
IN A PHOTOGRAPHIC CAMERA
Filed March 23, 1959　　　　　　　　　　　　2 Sheets-Sheet 2
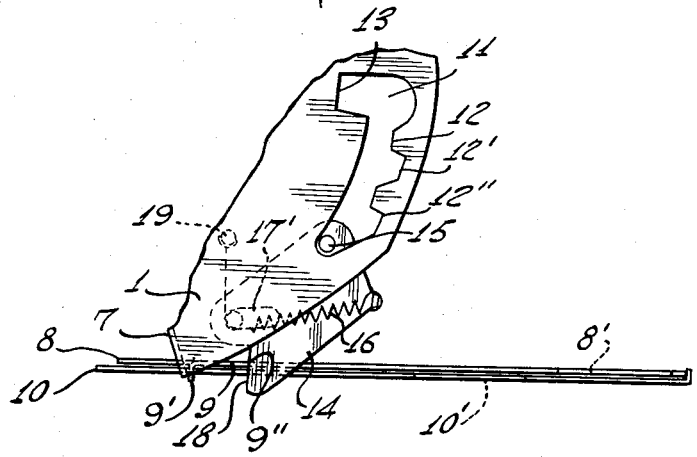
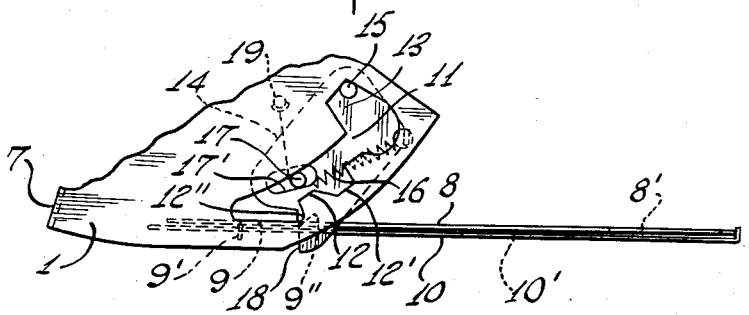
INVENTOR
SHO TAKAHAMA
BY Stanley Walder
ATTORNEY

United States Patent Office 3,012,490
Patented Dec. 12, 1961

3,012,490
DEVICE FOR PREVENTING THE OVERWINDING OF FILM AND THE PREMATURE RELEASE OF THE SHUTTER IN A PHOTOGRAPHIC CAMERA
Sho Takahama, Nishinomiya-shi, Japan, assignor to Yashica Co., Ltd., Tokyo, Japan, and Kabushiki Kaisha Konan Kamera Kenkyu-jo, Hyogo-ken, Japan, corporations of Japan
Filed Mar. 23, 1959, Ser. No. 801,288
Claims priority, application Japan Apr. 23, 1958
8 Claims. (Cl. 95—31)

The present invention relates to a means for preventing the advance of more than one frame's length of film in a photographic camera while at the same time avoiding the actuation of a shuter before the film is fully advanced the length of such frame.

In many cameras which combine film transport and shutter setting or cocking in the same operation, the shutter may actually be set before the spring is fully wound and hence actuation of the shutter release button will cause the shutter to expose the film before it has been advanced the length of a full frame. Additionally, many cameras employ either a rather complex mechanism to stop the transport of film once the length of one frame has been advanced while others have no such stop mechanism but rely upon indicia upon the back of a film, observable through a window in the camera case, to indicate to the user when a full frame length has been advanced.

It is a primary object of the present invention to provide simple means to both stop the advance of the film beyond a frame's length and prevent the actuation of the shutter before the frame has been fully advanced.

The above and other objects are achieved in the preferred embodiment of the present invention here described by means which include forming on the cocking lever of a simultaneous film transport and cocking system an arcuate slot, one border of which is serrated and the other being smooth, and to provide a safety plate pivoted by means of a pivot slot therein about a fixed pin, which plate bears an upstanding lug positioned to travel within said arcuate slot along said serrated border as said film is being wound and to occupy successive valleys within serrations during the process, preventing said cocking lever from returning to a rest position during the course of such winding. Said lug advances in said slot until one end is reached.

Meanwhile, the travel of the shutter plates toward a cocking position causes a lug outstanding from one of said plates to engage said safety plate and push it along its pivot slot, thereby displacing said lug in said arcuate slot to the smooth border of said slot opposing the serrated border thereof, thus freeing the cocking plate and permitting it to return to its rest position and causing said lug to be displaced relative said slot to the opposite end thereof into a steep-walled indentation at the other end of said slot, thereby preventing the further transport of the film by the detent action of the steep walls of said last mentioned indentation in said lug. During this operation, up to the point where the safety plate was caused to travel about the fixed pin along its pivot slot, the actuation of the shutter has been prevented by reason of the continual contact of the cocking lever with a lug outstanding from the shutter which contact was maintained until a full frame of the film has been transported.

Other objects and a fuller understanding of the present invention may be had by referring to the following detailed description and claims, taken in conjunction with the accompanying drawings which illustrate the preferred embodiment thereof, it being understood that the foregoing statement of the objects of the invention and the brief summary thereof is intended to generally explain the same without limiting it in any manner.

FIG. 4–I is a fragmentary plan view showing the relation of the parts just after the shutter has been set.

FIG. 4–II is a similar plan view showing the said parts after the shutter has been set and after the cocking lever has returned to its rest position but before the shutter has been actuated.

Figure 1:
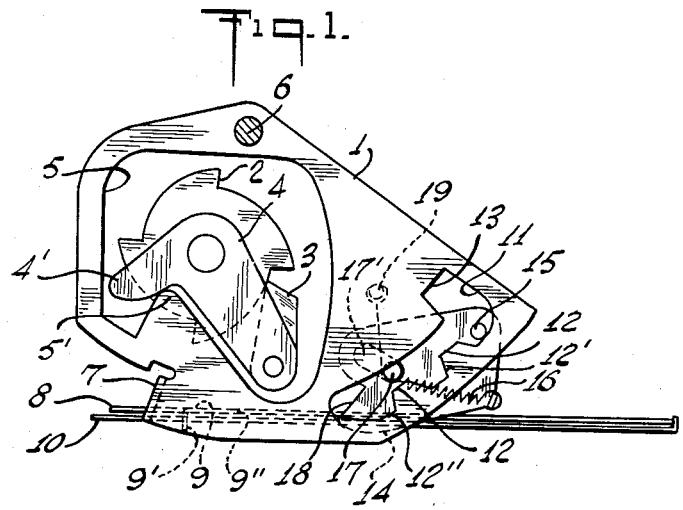
FIG. 1 is a plan view of an embodiment of the present invention.

Referring now to the drawings, the preferred form of the invention there illustrated consists of a cocking lever 1 which is pivotally mounted to a camera housing (not shown) by means of a pin 6 and which is biased in a clockwise direction (as shown in FIG. 1) by a spring, not shown. Said cocking lever 1 is turned in a counterclockwise direction by means of a knob (not shown) positioned outside the camera housing, which rotates means fixed to a winding lever 4 positioned within a punched-out aperture 5 in cocking lever 1, the shorter arm 4' of which contacts and moves an inwardly projecting contact member 5' integral with cocking lever 1 and thus moves cocking lever 1 in a counterclockwise direction, while a pawl 3, pivotally mounted to the long arm of winding lever 4, contacts a ratchet wheel 2 which in turn drives a film transport mechanism (not shown), all of which is more fully and completely explained in my copending application, filed simultaneously herewith, entitled Related Film Transport Shutter Setting and Film Counter Means.

There depends from cocking lever 1 a contact member 7 which strikes against and moves towards the right (in FIG. 1) the contact end 9' of a lug 9 upstanding from a focal plane shutter plate 8 in which is formed an aperture 8' and which as it is caused to move toward the right pushes along with it the second focal plane shutter plate 10 which has formed therein a similar aperture 10', which plates, together with biasing springs and setting mechanism (not shown), comprise a focal plane shutter and which is more fully described in my copending application, filed simultaneously herewith, entitled Shutter for Photographic Cameras.

Figure 2:
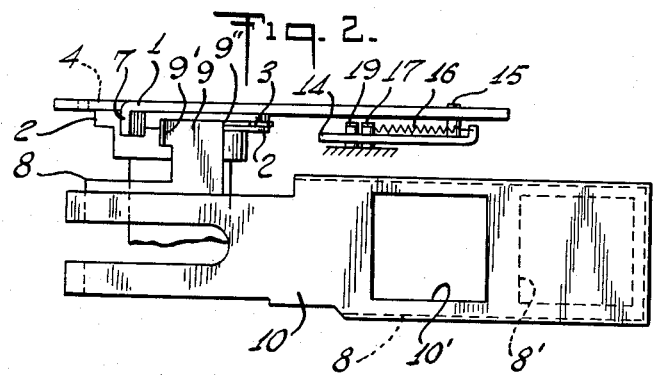
FIG. 2 is an elevational view thereof.
Figure 3:
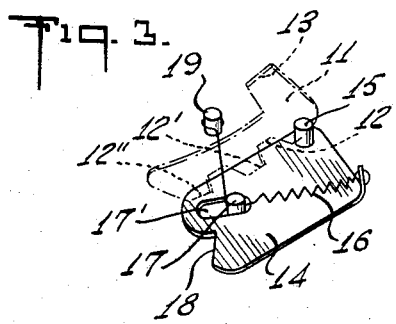
FIG. 3 is a perspective view of the safety plate and fixed pin, the slot in the cocking lever being shown in dot-dash outline.

There is formed along an outer portion of cocking lever 1 an arcuate slot 11, the distal border of which is serrated so as to form teeth 12 within which are positioned notches 12' and 12'', the rearward edges of such teeth being inclined relatively gradually and the forward edges of such teeth being abrupt almost normal to the floor of the notch adjoining it, the opposite or proximal border of said slot being relatively smoothly arcuate except that at the rearward portion thereof it falls away to form a recess 13 having walls which are sharply inclined to the base thereof. A safety plate 14 is pivotally mounted about a fixed pivot 17 (which is rigidly connected to the housing of the camera beneath slot 11 in cocking lever 1) by means of an engaging pivot slot 17', said plate being biased towards pivot 17 by means of a spring 16 secured between said pivot and an upstanding portion of said plate, the end of said spring being finally connected to another fixed pin 19 (likewise rigidly connected to said housing). An upstanding lug is carried by plate 14 and positioned to travel within slot 11, its position in the normal or uncocked condition of the shutter being within said slot opposite recess 13 in said slot and proximate the first tooth 12 (as shown in FIGS. 1, 2 and 3).

After cocking lever 1 is moved counterclockwise to both advance the film and commence the cocking of the shutter, contact member 7 makes contact with contact end 9′, commencing the movement of the shutter plates toward the right. At the same time, since cocking lever 1 is moving relative to plate 14 and lug 15, lug 15 travels along groove 13 and first climbs the leading edge of teeth 12 and then falls into notch 12′, spring 16 biasing safety plate 14 substantially in a radial direction and maintaining lug 15 along the distal edge of slot 11. Since notch 12′ has a sharply ascending wall, as the winding is stopped at this point cocking lever 1 will nevertheless not, under the action of its biasing spring, travel clockwise to its rest position but will be maintained in the position at which the winding has stopped. The same action will take place when lug 15 enters notch 12″. As the winding of the film and the cocking of the shutter continues, lug 9 is pushed still further towards the confronting contact edge 18 of plate 14 until, when the cocking is just about finished and lug 15 has just about reached the front limit of slot 11, lug 9 contacts said edge 18 and causes safety plate 14 to rotate in a counterclockwise direction about pivot 17, and safety plate 14 is then drawn along pivot slot 17′. As the winding is completed and stopped, cocking lever 1 is returned by its biasing spring to its normal or rest position as shown in FIG. 1, lug 15 then travelling relative slot 11 along the arcuate proximal wall of said slot into recess 13. In this position any further counterclockwise rotation of cocking lever 1 is prevented by reason of the steep wall of recess 13, so that one film length having been advanced no more film may be advanced until after the shutter has been actuated.

After cocking lever 1 has returned to its rest position lug 15 will be pressed against the right hand wall of recess 13. When the shutter release button is pressed and shutter plate 8 runs towards the left, lug 9 will become disengaged from plate 14 and said plate will again slide along pivot slot 17′ and return to its original pivot position relative pivot pin 17, thus effectively returning lug 15 to the position shown in FIG. 1.

It will be noted that throughout the cocking operation contact member 7 depending from cocking lever 1 is in contact with lug 9 upstanding from shutter plate 8 so that said plate may not be displaced to the left even if the shutter release button is pressed before the cocking operation has been completed. Hence until the shutter has been set and cocking lever 1 returned to the rest position, the shutter cannot be actuated.

Although the present invention has been illustrated and described as a part of a focal plane shutter, it may be employed with other types of shutters both to prevent premature actuation of the shutter and overwinding of the film.

In attaining the effective structure above described a great simplification has been achieved by the use of one spring to retain the lug against opposing walls of the same slot, this feature being enabled by relatively shifting the fulcrum of said plate by causing the plate to move along a pivot slot.

Details with respect to the cooperating parts of a camera, in which the embodiment of the present invention here described in detail may be employed, are contained in my copending applications filed simultaneously herewith, Serial No. 801,289, filed March 23, 1959, now Patent No. 2,960,922 and entitled Flash Synchronizing Device for Cameras, Serial No. 801,287, filed March 23, 1959, and entitled Device for Automatically Returning a Counter and Ejecting a Magazine, and Serial No. 801,286, filed March 23, 1959, and entitled Magazine for Photographic Cameras.

Although the present invention has been described with a certain degree of particularity, it is understood that the present disclosure has been made only by way of example and that numerous variations may be employed without transcending the scope of the invention as hereinafter claimed.

What is claimed is:

1. A camera actuating mechanism comprising a shutter member movable between a cocked and uncocked position, a rotatable film take-up drive member, a cocking member movable between an advanced and retracted position, means effecting the rotation of said drive member a predetermined increment less than 360° and corresponding to a frame advance of the film during the movement of said cocking member toward its advanced position, means effecting the movement of said shutter member to its cocked position during the movement of said cocking member to its advanced position, means preventing the return of said cocking member prior to its reaching its advanced position and locking said cocking member in retracted position responsive to said shutter member being in cocked position, and means responsive to the movement of said shutter member toward its uncocked position adapted to release said cocking member from said locked position.

2. A camera actuating mechanism comprising a cocking member rockable between an advanced and retracted position and normally urged toward its retracted position, a film take-up drive member rotatable a predetermined increment less than 360° and corresponding to a frame advance of the film with the movement of said cocking member to its advanced position, a shutter member movable between a cocked and uncocked position and movable by said cocking member to a cocked position, means normally preventing the return movement of said cocking member prior to its reaching its advanced position and locking said cocking member in retracted position responsive to said shutter member being in cocked position, and means responsive to the movement of said shutter member toward its uncocked position adapted to release said cocking member from said locked position.

3. A camera actuating mechanism comprising a cocking plate rockable in the plane thereof between a retracted and an advanced position and normally urged to its retracted position, a first abutment element carried by and movable with said cocking plate, a shutter member movable between a cocked and an uncocked position and normally urged toward an uncocked position, a second abutment element carried by and movable with said shutter member and releasably engageable by said first abutment element to move said shutter member to cocked position upon advance of said cocking plate, a film take-up drive member, means rotating said drive member with the advance of said cocking plate a predetermined increment of less than 360° corresponding to a frame advance of the film, latching means preventing the return of said cocking plate prior to its reaching its advanced position and preventing the advance of said cocking plate responsive to said shutter member being in cocked position, and means responsive to the movement of said shutter member toward its uncocked position adapted to release said cocking plate from said locked position.

4. A camera actuating mechanism in accordance with claim 3 including a rockable cocking lever engaging said cocking plate, said film take-up drive member including a ratchet wheel, and a pawl carried by said lever and engaging said ratchet wheel.

5. A camera actuating mechanism comprising a cocking plate rockable between a retracted and an advanced position and normally urged to its retracted position, a first abutment element carried by and movable with said cocking plate, a shutter member movable between a cocked and uncocked position and normally urged toward its uncocked position, a second abutment element carried by and movable with said shutter member and releasably engageable by said first abutment element to move said shutter member to its cocked position upon advance of said cocking plate, a film take-up drive member, means rotating said drive member with the advance of said cocking plate a predetermined increment of less than 360° corresponding to a frame advance of the film, said cocking plate having an opening formed therein extending longitudinally from a leading to a trailing end substantially in the direction of movement of said plate in the vicinity of said opening, a longitudinal edge of said opening being serrated and a latching slot being formed in the edge of said opening adjacent to its leading end, a latching plate rockable about an axis eccentric and parallel to the axis of rotation of said cocking plate, a detent mounted on said latching plate and registering with said cocking plate opening and engaging said serrated edge during the advance of said cocking plate preventing the return thereof, means urging said detent out of engagement with said serrated edge upon said detent reaching said opening trailing end to permit the return of said cocking plate and urging said detent into engagement with said latching slot to prevent the advance of said cocking plate, and unlatching means moving said detent out of registry with said slot upon movement of said shutter member from its cocked position to permit the advance of said cocking plate.

6. A camera actuating mechanism in accordance with claim 5 wherein said unlatching means includes an arm located on said latching plate in the path of said shutter member when said detent registers with said slot, said shutter member, during its return to its uncocked position, engaging said arm to move said latching plate whereby said detent is disengaged from said slot to permit the advance of said cocking plate.

7. A camera actuating mechanism in accordance with claim 5 including a pivot pin spaced from the axis of rotation of said cocking plate, said latching plate having a slot formed therein registering with said pivot pin.

8. A camera actuating mechanism in accordance with claim 7 including a tension spring extending between said pivot pin and said latching plate.

References Cited in the file of this patent
UNITED STATES PATENTS

| | | |
|---|---|---|
| 2,206,105 | Mihalyi | July 2, 1940 |
| 2,364,466 | Nagel | Dec. 5, 1944 |
| 2,836,109 | Mamiya | May 27, 1958 |
| 2,865,272 | Deffenbaugh et al. | Dec. 23, 1958 |

FOREIGN PATENTS

| | | |
|---|---|---|
| 609,000 | Germany | Feb. 6, 1935 |